United States Patent [19]

Riemhofer

[11] 4,080,345

[45] Mar. 21, 1978

[54] CATALYST MIXTURE FOR USE IN TRIMERIZING AND/OR POLYMERIZING ISOCYANATES AND/OR FOR THE POLYADDITION OF ACTIVE HYDROGEN ATOM CONTAINING POLYETHERS AND POLYISOCYANATES

[75] Inventor: Franz Riemhofer, Memmingen, Germany

[73] Assignee: Metzeler Schaum GmbH, Memmingen, Austria

[21] Appl. No.: 663,462

[22] Filed: Mar. 3, 1976

Related U.S. Application Data

[63] Continuation of Ser. No. 499,259, Aug. 21, 1974, abandoned.

[30] Foreign Application Priority Data

Aug. 21, 1973   Austria ................................. 7268/73
Jul. 31, 1974    Austria ................................. 6300/74

[51] Int. Cl.² ............................................. C08G 18/18
[52] U.S. Cl. ......................... 260/2.5 AC; 260/2.5 AB;
260/75 NB; 260/75 NC; 260/77.5 AB;
260/248; 544/180

[58] Field of Search ................ 260/2.5 AC, 77.5 NC,
260/2.5 AB, 77.5 AB, 75 NB, 75 NC, 248 R,
248 CS; 252/428, 429 R

[56] References Cited

U.S. PATENT DOCUMENTS

| | | | |
|---|---|---|---|
| 2,926,147 | 2/1960 | Rappaport et al. | 260/2.5 AC |
| 3,112,320 | 11/1963 | Farkas | 260/2.5 AC |
| 3,205,201 | 9/1965 | Friedrich et al. | 260/77.5 NC |
| 3,939,106 | 2/1976 | Dunleavy et al. | 260/2.5 AM |
| 3,946,038 | 3/1976 | Mao et al. | 260/2.5 AM |

*Primary Examiner*—M. J. Welsh
*Attorney, Agent, or Firm*—Burgess, Dinklage & Sprung

[57] ABSTRACT

Catalyst mixture for use in trimerizing and/or polymerizing isocyanates and/or for the polyaddition of active hydrogen atom containing polyethers and polyisocyanates comprising an amine as conventionally used in polyurethane chemistry in combination with an alkali metal salt of an inorganic acid and the trimerization and/or polymerization and/or polyadditions reaction utilizing such catalyst mixture.

11 Claims, No Drawings

CATALYST MIXTURE FOR USE IN TRIMERIZING AND/OR POLYMERIZING ISOCYANATES AND/OR FOR THE POLYADDITION OF ACTIVE HYDROGEN ATOM CONTAINING POLYETHERS AND POLYISOCYANATES

This is a continuation of application Ser. No. 499,259, filed Aug. 21, 1974, and now abandoned.

The trimerization and/or polymerization of isocyanates and the polyaddition of active hydrogen atom containing polyethers and polyisocyanates with the use of catalysts is known.

As conventional catalysts for such trimerization or polymerization of isocyanates, there have heretofore been used alkali and alkaline earth metal salts of organic and weak inorganic acids, alcoholates and phenolates of alkali and alkaline earth metals, alkali metal hydroxides and quaternary ammonium bases, certain tertiary amines, generally also basic compounds i.e., those which are known to give basically reacting aqueous solutions.

The trimerization or polymerization of isocyanates is utilized for the production of cold hardening urethanes and isocyanurate group containing spongy plastics, wherein in the conventional reaction, the artisan proceeds so that simultaneously with the foaming of the mixture of active hydrogen atom containing polyether, polyisocyanate, water, and/or other reaction modifier, catalyst, possibly crosslinking agent and/or additional substances known for use as adjuvants in such reactions, there is carried out a trimerization or polymerization of the di- or higher functional isocyanate, with the known trimerization or polymerization catalyst.

However, in the conventional procedures for the preparation of so-called cold foams, the desired higher functional isocyanates are produced for example from toluylene diisocyanate (for instance by means of trimerization), the latter, i.e., the isocyanates, are then dissolved in the monomeric diisocyanates and the thusly obtained "modified isocyanates are then used as the isocyanate component. This manner of proceeding is very uneconomical and still further, the physical properties of the resultant cold hardened foamed plastics, especially with respect to the hardness thereof are not satisfactory.

This state of the art i.e., the art for instance on which the foregoing is based, has for example been set forth in the following patents:

German Pat. Nos. 951,168, 1,013,869, 1,203,792 and 1,769,023;

German Auslegeschrift Nos. 1,022,789, 1,112,284;

German Offenlegungsschuflen Nos. 1,929,034, 2,051,304, 1,052,028, 2,052,380, 2,129,922, 2,129,988, 2,145,424;

U.S. Pat. Nos. 2,801,244, 3,154,522, 3,635,848;

British patent specification Nos. 809,809, 821,158, 837,120, 856,372, 920,080, 927,173, 941,379, 944,309, 949,253, 952,931, 954,095, 962,689, 966,388; and French Pat. No. 1,150,342.

It is an object of the present invention to provide an improved catalyst mixture for use in trimerizing and/or polymerizing isocyanates and/or for the polyaddition of active hydrogen atom containing polyethers and polyisocyanates.

Another object of the invention is a method for trimerizing and/or polymerizing isocyanates and/or for the polyaddition of active hydrogen atom containing polyethers and polyisocyanates whereby the disadvantages of the art are avoided.

Still another object of the invention is a method for trimerizing and/or polymerizing isocyanates and/or for the polyaddition of active hydrogen atom containing polyethers and polyisocyanates using the novel catalyst mixture of the invention.

In accordance with the invention, there is now provided a catalyst for the trimerization and/or polymerization of isocyanates and/or polyaddition of active hydrogen atom group containing polyethers and polyisocyanates comprising a mixture of an amine as conventionally utilized in polyurethane chemistry and an alkali metal salt of an inorganic acid.

Further in accordance with the invention, there is provided a method for manufacturing cold hardening urethane group containing foam materials from active hydrogen atom containing polyethers, polyisocyanates, water and/or other reaction modifiers and optionally also crosslinking agents and/or other adjuvants.

As alkali metal salts of inorganic acids for use in accordance with the invention, there come into consideration, for instance the salts derived from inorganic acids whose dissociation constant in aqueous solution is greater than $10^{-4}$ (pK value less than 4.0), preferably greater than $10^{-1}$ (pK value less than 1). Such salts include for example the sulfates, thiosulfates, nitrates and halides preferably the chlorides and bromides of alkali metals especially of sodium and potassium. Particularly preferred are sodium chloride and potassium chloride. The salts of carbonic acid are excepted as not being usable in accordance with the invention. Ammonium and alkaline earth metal salts of inorganic acids are also not suitable.

The alkali metal salts of inorganic acids can be used in the form of their aqueous solutions. In this connection, the maximum amount of alkali metal salt of inorganic acid used is dependent on or defined by its solubility in water.

The alkali metal salt of the inorganic acid can however, also be used in its solid form. Therein it is most advantageous if the salt is used in a finely pulverized form.

As a further possibility, there is mentioned, the use of the alkali metal salt of the inorganic acid in the form of a dispersion or paste. The dispersion or paste is advantageously prepared from a mixture of the finely pulverized alkali metal salt of the inorganic acid and a nonaqueous liquid as for instance the charged polyether. While there is a preferred embodiment, the invention is not limited to this form of the use of the alkali metal salt of the inorganic acid.

The least amount of the alkali metal salt of the inorganic acid usable in accordance with the invention is dependent on and differs with the overall and total composition of the formulation used in connection with preparing the foam. The least and maximum amount of the alkali metal salt for any particular formulation can easily be determined by the artisan by simple and rapidly carried out experiments. As a rule, the alkali metal salt of the inorganic acid is used in an amount of 0.01 to 10, preferably 0.01 to 5, and most preferably 0.1 to 5 weight percent calculated on the total mixture to be foamed.

As polyisocyanate reactant, there come into consideration all of the isocyanates known as suitable for use in the manufacture of polyurethane foam materials. 2,4- and/or 2,6-toluylene-diisocyanates are preferred and especially preferred are the technical isomer mixtures i.e., 65 and 80 weight % of 2,4-isomers.

For preparing polyurethane materials, in accordance with the invention, there are used as starting materials, polyethers having at least 2 opposing isocyanate reactable hydrogen atoms and having a molecular weight in the range of 400–10,000. By the latter, there is understood, compounds which can additionally contain amino groups, thiol groups and carboxyl groups and preferably polyhydroxyl group containing compounds: most preferably compounds containing 2 to 8 hydroxyl groups. Especially preferred are these latter compounds having a molecular weight of 800–10,000 and preferably 1,000–6,000 as illustrated for instance by polyethers containing at least 2, i.e., 2 to 8 and more preferably 2 to 4 hydroxyl group containing polyethers which are known to the art for the manufacture of cell containing polyurethanes. These latter compounds are prepared for instance by the polymerization of epoxides, such as ethylene oxide, propylene oxide, butylene oxide, tetrahydrofurane, styrene oxide or epichlorhydrin, per se, for example in the presence of $BF_3$ or through addition of these epoxides if desired, in the form of their mixtures or successively as starting components on to reactable hydrogen atom containing compounds such as alcohols or amines, for instance, water, ethylene glycol, propylene glycol-(1,3) or -(1,2)-trimethylolpropane-4,4'-dihydroxydiphenylpropane, aniline, ammonia, ethanolamine, ethylenediamine and the like. There are also usable herein sucrose polyethers as for instance described in German Auslegeschrift Nos. 1,176,358 and 1,064,938. Frequently there are preferred polyethers which predominantly have (up to 90 weight % calculated on all of the available OH groups in the polyether) primary OH groups. Also suitable in this connection are the vinyl polymerizate modified polyethers, as are for instance obtained through polymerization of styrene and/or acrylonitrile in the presence of polyethers. (U.S. Pat. Nos. 3,383,351, 3,304,273, 3,523,093 and 3,110,695, German Pat. No. 1,152,536) and likewise OH group containing polybutadiene. Representative instances of the compounds usable in accordance with the invention are those compounds described for instance, in High Polymers, Vol. XVI, " Polyurethanes, Chemistry and Technology", Saunders-Frisch, Interscience Publishers, N.Y.-London, Vol. 1, 1962, p 32–42 and 44–54 and Vol. II 1964, p 5–6 and 198–199 and also in Synthetics Handbook, Vol. VII, Vieweg-Hochtlen, Carl Hanser-Verlag Muchen, 1966 for instance at p 45–71.

In accordance with the invention water and/or light liquid organic substances may be used as the reaction medium. Examples of such organic reaction medium liquids include for instance, acetone, ethylacetate, methanol, ethanol, halogen-substituted alkanes as for instance methylene chloride, chloroform, ethylidene chloride, vinylidene chloride, monofluorotrichloromethane, chlorodifluoromethane, dichlorodifluoromethane and the like, also butane, hexane, heptane and diethylether. A reaction promoting or facilitating effect can also be obtained through the addition of compounds to the reaction mixture which at temperatures above room temperature decompose to split off gas as for instance nitrogen as do for example azo compounds such as azobutyric acid nitrile. Still other examples of reaction facilitating materials suitable for use herein are those set forth in the Synthetics Handbook, Vol. VII, ViewegHochtlen, Carl Hanser-Verlag Munchen 1966, for instance at p 108, 109, 453–455 and 507–510.

In accordance with the invention, there are further employed amine catalysts which are already known to the art as for instance tertiary amines such as triethylamine, tributylamine, N-methylmorpholine, N-ethylmorpholine, N-cocomorpholine, N,N,N',N'-tetramethylethylenediamine,1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamino, pentamethyldiethylenetriamine, N,N-dimethylcyclohexylamine, N,N,N',N'-tetramethyl-1,3-butanediamine, N,N-dimethyl-betaphenylethylamine, 1,2-dimethylimidazol, 2-methylimidazol and the like.

Tertiary amines having active hydrogen atoms for opposing isocyanate groups are for example illustrated by triethanolamine, N-ethyldiethanolamine, N,N-dimethylethanolamine as well as their reaction products with alkylene oxides such as propylene oxide and/or ethylene oxide.

As amine catalysts, there further come into consideration, silaamines having —C— Si bonds as for example described in German Pat. No. 1,229,290 for instance 2,2,4-trimethyl-2-silamorpholine, 1,3-diethylaminomethyltetramethyl-disiloxane and the like.

There can also additionally be used as catalysts metal compounds and in particular organic tin compounds. However, this is not as a rule necessary. As suitable organic tin compounds, there may be mentioned tin (II) salts of carboxylic acids such as tin(II)-acetate, tin-(II)octoate, tin(II)-ethylhexoate and tin(II)-laurate and the dialkyl tin salts of carboxylic acids such as dibutyltin diacetate, dibutyl-tin dilaurate, dibutyl-tin maleate or dioctyl-tin diacetate.

Further instances of suitable catalysts have been described in detail in Kunstoff-Handbuch, Vol. VII, Vieweg and Hochtlen, Carl Hanser Verlag, Munchen, 1966 for instance at p 96–102.

The amine catalysts are as a rule used in an amount of between about 0.001 and 10 weight % calculated on the total foam mixture.

There can also be used according to the invention, surface active additives (emulsifiers, stabilizers, etc.). As emulsifiers, there may be mentioned, salts of fatty alcohol sulfonates and sulfonic acid such as the sodium salt of ricinusolsulfonate, of the salts of fatty acids and fatty acid amine salts such as oleic acid diethylamine or stearic acid diethanolamine. There further may be used for this purpose the alkali or ammonium salts of sulfonic acid, for instance of dodecylbenzene sulfonic acid and dinaphthylmethane disulfonic acid and of fatty acids such as ricinoleic acid or polymeric fatty acid having a surface active effect.

As foam stabilizers, there come into consideration, above all water soluble polyethersiloxanes. These compounds are in general so constructed that a copolymerizate of ethylene oxide and propylene oxide is joined with a polydimethylsiloxane residue. Such stabilizers are known and have for instance been described in U.S. Pat. No. 2,764,565.

There can also be employed in accordance with the invention, crosslinking agents. As crosslinking agents there can be used in addition to the above-mentioned active hydrogen containing tertiary amines, other 2 or more active hydrogen atom containing relatively low molecular weight compounds, as for instance glycerin, trimethylolpropane, diethanolamine or diisopropanolamine. Other examples of crosslinking agents and particulars regarding their application have been set forth in Kunstoff-Handbuch, Vol. VII, Vieweg and Hochtlen, Carl Hanser-Verlag Muchen, 1966 for example at p 106–108. When cross-linking agents are used, they are generally employed in an amount of between about 0.5 and 10 weight % calculated on the total foam mixture.

In accordance with the invention, there can further be employed reaction retarding or delaying agents, as for instance acid reacting materials such as hydrochloric acid and organic acid halogenides.

Cell regulators can also be used which are known to the art as for example paraffin, fatty alcohols, dimethylsiloxanes, and the like.

In addition, there may be used pigments, dyestuffs, flameproofing agents which are known to the art, for instance tris-chloroethylphosphate or ammonium phosphate and polyphosphate, stabilizers against aging and for providing resistance to weathering, softeners, fungistatic and bacteriostatic agents, fillers such as barium sulfate, kieselguhr, carbon black, chalk, etc.

Additional examples of additive, for instance surface active agents, foam stabilizers, cell regulators, reaction retarders or accelerators, flameproofing agents, softeners, dyes, pigments, etc. suitable for use herein are set out in considerable detail in Kunstoff Handbuch, Vol. VII, Vieweg and Hochtlen, Carl Hanser Verlag Munchen, 1966 for instance at p 103–113.

The reaction components are in accordance with the invention brought to reaction by the known single stage procedures for the prepolymerization or the semi-propolymerization whereby there is conventionally used mechanical installations as have been described in U.S. Pat. No. 2,764,565. Particulars of other suitable mechanical installations for use herein have been described in Kunstoff-Handbuch, Vol. VII, Vieweg and Hochtlen, Carl Hanser-Verlag Munchen, 1966 for example at p 121–205.

Using the process of the invention, it is possible with a marked decrease in expenditures for the cold foam manufacturing process and using readily available, conventional materials, that is, polyether-polyols, water, crosslinking agents for instance glycerin, diisopropanolamine, triethanolamine, if desired auxilliary reaction materials as for instance fluorochlorohydrocarbons and conventional amine accelerators such as triethylenediamine, N-methyl-N′-di-methylaminoethylpiperazine or dimethylaminoethanol as well as under exclusive use of toluylene diisocyanate to prepare highly elastic polyurethane soft foams which frequently in contrast to the heretofore known cold foams with similar hardness are lighter or at similar bulk density are harder. The burning properties of the resins prepared in accordance with the cold foaming process of the invention correspond to that of the known cold foams. The working range of the foam materials prepared by the process of the invention is very great and extends between collapse and skrinkage.

The activity of the alkali metal salts as catalysts in accordance with the invention, increases with increasing atomic weight of the alkali metal, that is lithium salts are less active than sodium salts and these latter salts less active than potassium salts.

The isocyanate groups which are used up in the trimerization or polymerization reaction are perceived as such by formal values of over 100, suitably about 105 and 120. By "formal value", there is meant the value calculated in the conventional manner according to which the trimerization or polymerization reaction which has supposedly occurred is not taken into consideration in the calculation. When one assumes that in the trimerization or polymerization, for instance 10% of the isocyanate groups are consumed then a formal value of 110 corresponds to an effective value of 99.

When a nitrite, as for instance sodium nitrite is used as catalyst, then the reaction proceeds very rapidly. In addition to the alkali metal ion catalyst induced trimerization or polymerization reaction which takes place, a further reaction often sets in which results in an orange colored foam material. The intensity of the orange coloration is dependent on the amount of the nitrite used, the more of the nitrite, the more intense the coloration. The color formation which only sets in through the presence of the nitrite can undoubtedly be traced back to a diazo reaction, which occurs by virtue of the reaction of the nitrite ions and the aromatic amino groups which are formed from the reaction of the water and the isocyanate groups so that a diazotization of the aromatic compounds through a coupling reaction produces azo dyestuffs. This reaction can for instance be utilized for coloring the foam, the isocyanate groups also thereby used up and therewith the effective formal value further decreased.

The cold hardened polyurethane foams obtained in accordance with the invention are for instance useful as cushions for use by the automobile industry.

The invention will be further illustrated by the following Examples, the same are however in no wise to be construed as limitative of the scope thereof. In the Examples, all parts are parts by weight, unless otherwise indicated.

EXAMPLE 1

| | |
|---|---|
| Polyether (OH number - 35) (prepared by the addition of propylene oxide and ethylene oxide onto trimethylolpropane) | 100.0 |
| Water (total) | 4.0 |
| Glycerin (100 %) | 5.0 |
| Triethanolamine | 1.0 |
| "triethylenediamine" | 1.0 |
| Toluylene-diisocyanate | 60.3 |
| | (formal value = 100) |

The polyether, water, as specified the aqueous salt solution, glycerin, triethanolamine and "triethylenediamine" were measured out into a beaker and mixed together thoroughly using a rapidly rotating stirrer for the mixing. The isocyanate was added during the stirring and the intensive stirring continued for another 5 seconds following completion of the addition.

The mixture was poured into a form constructed of folded soda-Kraft paper open at the top, having a surface area of 30 × 30 cm and a height of about 30 cm and therein permitted to foam freely.

All of the experiments were carried out in the same manner and with 500 g additions of the polyol.

This formulation was followed under use of a toluylene-diisocyanate having a 2.4-isomer content of 80 wt % (Isocyanate-1) and also using a toluylene-diisocyanate having a 2.4-isomer content of 65 wt % (isocyanate-2), the procedure being conducted up to collapse. If instead of the toluylene-diisocyanate, the procedure was carried out using a silicious aluminum group modified toluylene diisocyanate having an NCO content of 40.7 wt % (Isocyanate-3) having a characteristic value of 100.95 and in a corresponding amount, there was obtained a useable foam.

By the term "triethylene diamine", there is meant herein, a 33 wt % solution of 1,4-diazabicyclo[2.2.2]octane in dipropylene glycol (2,2-dihydroxydipropyl ether).

In Table I which follows, there are set out the results and data of the experiments carried out using various amounts of different salts.

In the table
K = collapse
+ = useable foam
− = experiment not carried out to completion The salts were used in the form of aqueous solutions thereof. The maximum salt amount is determined by the solubility of the salt in the water available in the formulation.

The experiment was carried out as disclosed in Example 1 with a 500 g polyol addition. The salt was used in the form of its aqueous solution.

The determination of the mechanical properties was carried out about 24 hours after formation of the foamed material.

The formulation with addition of alkali metal salts results in collapse of the final product. If instead of the toluylene diisocyanate having a 2.4-isomer content of 65 wt % (Isocyanate-2), Isocyanate-3 having a characteristic value of 90 to 100 and in a corresponding amount is used, there is obtained a foam having a bulk density of between 27 and 29 kg/m$^3$ and a compression hardness value at 40% deformation of between 17 and 21 p/cm$^2$.

In the following table (Table 2), there are set out the

Table 1

| Salt | Isocyanate | \multicolumn{9}{c}{Parts Salt / 100 Parts Polyol} | maximal chargeable amount | Remarks |
|---|---|---|---|---|---|---|---|---|---|---|---|---|
| | | 0.01 | 0.02 | 0.05 | 0.1 | 0.2 | 0.35 | 0.4 | 0.8 | 1.0 | | |
| NaCl | 1 | − | + | − | − | + | − | + | + | + | | |
| Na$_2$SO$_4$ | 1 | K* | − | − | − | − | + | − | − | − | 0.56 + | |
| Na$_2$S$_2$O$_3$ | 2 | K | + | + | + | + | − | + | + | − | | |
| | 1 | K | + | + | + | + | − | + | + | − | | |
| NaNO$_2$ | 1 | K | + | + | + | + | − | K | − | − | 2.12 K | yellow to orange foam, from 0.4 NaNO$_2$ to rapid reaction |
| KCl | 1 | + | − | + | + | + | − | + | + | − | 1.06+ | |
| KNO$_3$ | 1 | + | − | + | + | + | − | + | + | − | | |
| LiSCN | 1 | K | − | − | K | + | + | + | + | − | 3.18 + | |
| NH$_4$Cl | 1 | K | − | K | K | K | − | K | K | − | 1.06 K | |
| MgCl$_2$ | 1 | K | K | − | K | − | K | − | − | K | 1.58 K | |
| CaCl$_2$ | 1 | − | K | − | K | − | − | K | − | − | 2.12 K | |
| BaCl$_2$ | 1 | − | K | − | K | − | K | − | − | − | 1.06 K | |

*K = collapse

EXAMPLE 2

The useability of different accelerators conventionally used in polyurethane plastic foam manufacture in the process of the invention was determined using the following basic formulation:

results of the runs carried out with the different amine accelerators and under use of varying amounts of NaCl. The indicated compression hardness values were determined at 40% deformation.

Table 2

| Amine | Parts Salt / 100 Parts Polyol | 0.92 NaCl | | 0.5 NaCl | | 0.1 NaCl | | 0.05 NaCl | |
|---|---|---|---|---|---|---|---|---|---|
| | | Bulk Density (kg/m$^3$) | Comp. Hardness* (p/cm$^2$) | Bulk Density (kg/m$^3$) | Comp. Hardness (p/cm$^2$) | Bulk Density (kg/m$^3$) | Comp. Hardness (p/cm$^2$) | Bulk Density (kg/m$^3$) | Comp. Hardness (p/cm$^2$) |
| Triethylendiamine | | 25.4 | 24.5 | 24.6 | 21.0 | 23.7 | 16.0 | Collapse | |
| Permethylated Ethylamino-piperazine | | 24.7 | 20.5 | 23.2 | 18.5 | 23.8 | 15.0 | Collapse | |
| Mixture composed of 5 Wt.-% 2,2,4-Tri-methyl-2-silamorpholine 35 Wt.-% Dimethylamino-ethanol and 60 Wt.-% permethylated Ethyl-amino-piperazine | | 23.5 | 18.5 | 32.8 | 23.5 | Partial Collapse | | Collapse | |
| Dimethylaminoethanol | | 23.2 | 20.5 | 25.0 | 17.5 | Collapse | | Collapse | |
| Dimethylbenzylamine | | Collapse, foamed but renewed Collapse | | Collapse, Collapse | | Collapse | | Collapse | |

*Comp. Hardness - Compression Hardness

| Polyether (according to Example 1) | 100.0 |
| Water - Total | 4.0 |
| Glycerin (100 %) | 2.0 |
| Amine accelerator | 1.0 |
| Toluylene diisocyanate having a 2.4-isomer content of 65 wt % (Isocyanate-2) | 50.0 (formal value = 100) |

EXAMPLE 3

The basic formulation as follows:

| Polyether (according to Example 1) | 100.0 |
| Water - Total | 4.0 |
| Diisopropanolamine | 4.0 |
| "Triethylenediamine" | 0.5 |
| Toluylene - diisocyanate | 52.14 (formal value = 100) | was prepared and the runs carried out using a toluylene-diisocyanate having a 2.4-isomer content of 80 wt % (isocyanate-1) and a toluylene-diisocyanate having a 2.4-isomer content of 65 wt % (Isocyanate-2), the salt contents of the formulations being varied as indicated.

All of the experiments were carried out with the addition of 500 g of polyol.

In Table 3 which follows, the results of these experiments have been set out. The compression values were determined at 40 % deformation.

If "triethylenediamine" was used in the above formulation and procedure, then at all salt concentrations collapse set in.

Table 3

| Parts Salt Per 100 Parts Polyol | Isocyanate 1 | | Isocyanate 2 | |
|---|---|---|---|---|
| | Bulk Density (kg/m³) | Comp. Hardness (p/cm²) | Bulk Density (kg/m³) | Comp. Hardness (p/cm²) |
| 0 | Shrinkage | | Collapse | |
| 0.1 NaCl | 23.8 | 17.0 | Partial | Collapse |
| 0.2 NaCl | — | — | Partial | Collapse |
| 0.3 NaCl | — | — | Partial | Collapse |
| 0.5 NaCl | 23.8 | 21.5 | 25.6 | 23.5 |
| 0.75 NaCl | 24.3 | 20.5 | 24.6 | 20.5 |
| 0.05 KCl | — | — | Partial | Collapse |
| 0.1 KCl | — | — | 23.1 | 15.0 |
| 0.2 KCl | — | — | 24.0 | 17.5 |
| 0.3 KCl | — | — | 24.0 | 18.5 |
| 0.4 KCl | — | — | Partial | Collapse |
| 0.5 KCl | — | — | Partial | Collapse |
| 0.75 KCl | — | — | Partial | Collapse |

EXAMPLE 4

The following basic formulation:

| Polyether (according to Example 1) | 100.0 |
|---|---|
| Water (Total) | 4.0 |
| Diisopropanolamine | 4.0 |
| "Triethylenediamine" | 0.5 |
| NaCl | 0.5 |
| Toluylene - diisocyanate | | was employed using a toluylene-diisocyanate having a 2.4-isomer content of 80 wt % (Isocyanate-1) and also a toluylene diisocyanate having a 2.4-isomer content of 65 wt % (Isocyanate-2), the formal values of which varied.

All of the experiments were carried out under hand addition of 500 g polyol. The NaCl was used in the form of its 20 % aqueous solution.

In Table 4 which follows, the results of these experiments have been reported. The defined compression hardness values were determined at 40% deformation. The Table also contains the results of comparison experiments in which in place of the toluylene-diisocyanate and NaCl, Isocyanate-3 was used.

Table 4

| Formal Value | Isocyanate 1 | | Isocyanate 2 | |
|---|---|---|---|---|
| | Bulk Density (kg/m³) | Comp. Hardness (p/cm²) | Bulk Density (kg/m³) | Comp. Hardness (p/cm²) |
| 100 | 25.4 | 24.0 | 25.0 | 20.0 |
| 105 | 24.8 | 27.0 | 26.2 | 27.0 |
| 110 | — | — | 26.2 | 33.0 |
| 120 | 26.8 | 46.0 | 24.0 | 30.0 |
| 140 | — | — | 24.2 | 51.0 |

| Value | Isocyanate 3 | |
|---|---|---|
| | Bulk Density (kg/m³) | Comp. Hardness (p/cm²) |
| 90 | 25.6 | 21.0 |
| 95 | 25.7 | 21.5 |
| 100 | 26.1 | 25.5 |

EXAMPLE 5

The following basic formulation was prepared:

| Polyether (according to Example 1) | 100.0 |
|---|---|
| Water - Total | 4.0 |
| Glycerin | 2.0 |
| "Triethylenediamine" | 1.0 |
| Salt | infra |
| Toluylene-diisocyanate | infra |

There were used therewith different salts in different amounts and also the formal value was varied by using as toluylene diisocyanate, a toluylene-diisocyanate having a 2.4-isomer content of 80 wt % (Isocyanate-1) or a toluylene-diisocyanate having a 2.4-isomer content of 65 wt % (Isocyanate-2).

All of the experiments were carried out with the hand addition of 500 g polyol. The salt was used in the form of its aqueous solution.

In Table 5 which follows, the results of these experiments have been reported. The compression hardness values were determined at 40 % deformation. The Table also contains the results of comparison experiments wherein in place of the toluylene-diisocyanate and salt, Isocyanate-3 was used.

Table 5

| Parts Salt Per 100 Parts Polyol | Value | Isocyanate 1 | | Isocyanate 2 | |
|---|---|---|---|---|---|
| | | Bulk Density (kg/m³) | Comp. Hardness (p/cm²) | Bulk Density (kg/m³) | Comp. Hardness (p/cm²) |
| — | 100 | Collapse | | Shrunk | |
| 0.1 NaCl | 100 | 24.5 | 15.0 | 25.2 | 16.0 |
| | 105 | 24.0 | 18.5 | 23.7 | 17.0 |
| | 110 | 23.7 | 20.0 | 24.0 | 22.0 |
| | 120 | 23.3 | 26.0 | 24.4 | 23.0 |
| | 140 | 24.4 | 41.0 | 24.3 | 34.0 |
| 0.5 KCl | 100 | 24.1 | 19.0 | 25.1 | 17.5 |
| | 105 | 23.7 | 21.0 | 26.1 | 22.0 |
| | 110 | 23.3 | 24.5 | 24.9 | 23.0 |
| | 120 | 23.4 | 31.0 | 24.4 | 29.5 |
| | 140 | 24.0 | 35.0 | 23.7 | 32.0 |

| Value | Isocyanate 3 | |
|---|---|---|
| | Bulk Density (kg/m³) | Comp. Hardness (p/cm²) |
| 90 | 27.2 | 17.0 |
| 95 | 28.6 | 21.0 |
| 100 | 27.0 | 21.0 |

EXAMPLE 6

Using the formulation

| | -A- | -B- |
|---|---|---|
| Polyether according to Example 1 | 100.0 | 100.0 |
| Water - Total | 4.0 | 4.0 |
| Glycerin (100 %) | 2.0 | 2.0 |
| "Triethylenediamine" | 0.5 | 0.5 |
| NaCl | 0.07 | 0.2 |
| Toluylene-diisocyanate having a 2.4-isomer content of 65 wt % (Isocyanate 2) | | | there were prepared with the formal values 100 (-A-) and 110 (-B-) foam samples having a length of about 500 mm, a width of about 300 mm and a height of about 500 mm. There was used in this connection a foam machine of type HK 100 (mixer head without twist body and having an outlet tube of 12 mm diameter). Because of the packet size in relation to the small discharge capacity, the foaming had to be partially carried out in an already started foaming mixture. The packet was charged at a discharge rate of the machine of 7 kg polyol/minute and with 300 machine rotations. The foam evidenced many closed cells, which however were not shrunken and allowed themselves to be easily compressed. The top zone of the sample evidenced by reason of the not very advantageous method employed, clearly marked dense regions.

In Table 6 which follows, there have been set out the physical properties of these foam samples, determined in mid height in fully compressed state.

Table 6

|  | A Before/After Hydrolysis Hardening | | B Before/After Hydrolysis Hardening | |
|---|---|---|---|---|
| Bulk Density (kg/m$^3$) | 23.2 | | 23.6 | |
| Compression Hardness (p/cm$^2$) | | | | |
| at 25 % deformation | 11.0 | | 14.0 | |
| at 40 % deformation | 13.5 | 19.0 | 17.0 | 24.5 |
| at 65 % deformation | 24.5 | | 32.0 | |
| Indentation Hardness (C-Punch, kp) | | | | |
| at 25 % deformation | 4.3 | | 5.6 | |
| at 40 % deformation | 5.6 | | 7.0 | |
| at 65 % deformation | 11.5 | | 13.5 | |
| Tensile Strength (kp/cm$^2$) | 0.55 | 0.63 | 0.55 | 0.73 |
| Breaking Strength (%) | 108 | 138 | 94 | 150 |
| Rebound - Elasticity (%) | 58 | | 63 | |
| Pressure deformation residue (%) | | | | |
| (22h / 70° C / 50 %) | 5.8 | | 5.7 | |
| Fatigue Test | | | | |
| Height Decrease (%) | 0 | | 2.0 | |
| Hardness Increase (%) | 24.0 | | 23.0 | |

EXAMPLE 7

In the basic formulation

| Polyether (according to Example 1) | 100.0 |
|---|---|
| Water - Total | 4.0 |
| Glycerin (100 %) | 2.0 |
| "Triethylenediamine" | 0.5 |
| NaCl | infra |
| Toluylene-diisocyanate having a 2.4-isomer content of 80 wt % (Isocyanate-1) | 55 (formal value = 110) | the amount of NaCl was varied, the NaCl being introduced in solid, finely divided form. All of the experiments were carried out as described in Example 1 with a 500 g weighed portion of the polyol.

Whereas without the addition of NaCl collapse set in, with the addition of 0.5, 1.0, 2.0, 3.0, 4.0 and 6.0 parts NaCl per 100 parts polyol, unshrunken foamed materials were obtained which in their properties correspond extensively to the foamed materials obtained in Experiment B of Example 6.

EXAMPLE 8

The procedure of Example 7 was repeated but using in this instance, instead of the Isocyanate-1, toluylene-diisocyanate having a 2.4-isomer content of 65 wt % - (Isocyanate-2).

Whereas without the addition of the NaCl, collapse set in, with the addition of 0.5, 1.0, 2.0, 3.0, 4.0, 6.0, 8.0 and 10.0 parts NaCl per 100 parts polyol, unshrunken foam materials were obtained which in their properties correspond extensively to the foam materials produced according to Experiment B of Example 6.

EXAMPLE 9

The procedure of Example 7 was repeated, however, in this case the NaCl was used in the form of a paste in the polyether of Example 1.

The paste was obtained by forming a dispersion of 200 parts NaCl in 400 parts of the polyether and by grinding for 48 hours in a ball mill.

Whereas without the addition of the paste, collapse set in, with the addition of 10 and 15 parts of the paste per 100 parts of the polyol, unshrunken foam materials were obtained having the same properties as those foams obtained according to Example 6, Experiment B.

I claim:

1. In a process for the production of a cold-hardening polyurethane foam by polymerization of toluylene diisocyanate or by polyaddition to a polyisocyanate of a polyether containing a reactive hydrogen atom, in the presence of an amine catalyst, the improvement which comprises performing the said polymerization of polyaddition in the presence of a catalyst consisting essentially of the catalytic amine and an alkali-metal salt of an inorganic acid selected from the group consisting of alkali-metal sulfates, thiosulfates, nitrates, and halides, the amine being present in the reaction mixture in an amount between 0.001 and 10% by weight and the alkali-metal salt being present in an amount between 0.01 and 10% by weight.

2. A process according to claim 1 wherein said alkali metal salt of an inorganic acid is a lithium, sodium or potassium salt.

3. A process according to claim 1 wherein said alkali metal of an inorganic acid is lithium-, sodium- or potassium chloride or bromide.

4. A process according to claim 1 wherein said alkali metal salt of an inorganic acid is lithium-, sodium- or potassium sulfate or thiosulfate or thiosulfate.

5. A process according to claim 1 wherein said alkali metal salt of an inorganic acid is lithium-, sodium- or potassium nitrate.

6. A process according to claim 1 wherein said alkali metal salt of an inorganic acid is used in an amount of 0.01 to 5 wt % based on the total foam mixture.

7. A process according to claim 1 wherein said alkali metal salt of an inorganic acid is used in an amount of 0.1 to 5 wt % based on the total foam mixture.

8. A process according to claim 1 wherein said alkali metal salt of an inorganic acid is used in the form of its aqueous solution.

9. A process according to claim 1 wherein said alkali metal salt of an inorganic acid is used in the form of a paste of the solid salt in a suitable liquid.

10. In a process for the production of a cold-hardening polyurethane foam by polymerization of an isocyanate or by polyaddition to a polyisocyanate of a polyether containing a reactive hydrogen atom, in the presence of an amine catalyst, the improvement which comprises performing the said polymerization or polyaddition in the presence of a catalyst consisting essentially of the catalytic amine and an alkali-metal salt of an inorganic acid selected from the group consisting of alkali-metal sulfates, thiosulfates, nitrates and halides, the amine being present in the reaction mixture in an amount between 0.001 and 10% by weight based on 100% by weight of polyol and the alkali-metal salt being present in an amount between 0.01 and 10% by weight based on 100% by weight of polyol.

11. A process for the production of a polyurethane foam as defined in claim 1 which comprises adding toluylene diisocyanate in an amount equivalent to 60.3 parts by weight to a mixture of 100 parts by weight of a polyether condensation product of ethylene oxide, propylene oxide and trimethylolpropane, 4 parts by weight of water, 5 parts by weight of glycerol, 1 part by weight of triethanolamine, 1 part by weight of a 33% by weight solution of 1,4-diazabicyclo[2.2.2]octane in 2,2'-dihydroxydipropyl ether, and between 0.01 and 10% by weight of an alkali-metal salt of an organic acid selected from the group consisting of alkali-metal sulfates, thiosulfate, nitrates and halides, and allowing the mixture to cold-harden to a foam.

* * * * *